United States Patent [19]

Staar

[11] Patent Number: 4,996,680

[45] Date of Patent: Feb. 26, 1991

[54] AUTOMATIC CHANGING APPARATUS FOR A RECORDING MEDIUM

[75] Inventor: Marcel J. H. Staar, Brussels, Belgium

[73] Assignee: Starr Development Company, S.A., Belgium

[21] Appl. No.: 355,656

[22] Filed: May 23, 1989

[30] Foreign Application Priority Data

Jun. 3, 1988 [BE] Belgium ............................. 08800627

[51] Int. Cl.$^5$ ............................................. G11B 17/24
[52] U.S. Cl. ........................................ 369/37; 369/36
[58] Field of Search ...................... 369/30, 33–34, 369/35, 36, 37, 38, 39, 191, 192; 360/131, 132, 137, 97.03, 98.01

[56] References Cited

U.S. PATENT DOCUMENTS

| | | | |
|---|---|---|---|
| 1,303,299 | 5/1919 | Hahl | 211/40 |
| 3,043,447 | 7/1962 | Lauck et al. | 214/1 |
| 3,322,108 | 5/1967 | Hoag | 124/8 |
| 3,561,987 | 3/1972 | Powell | 221/13 |
| 3,946,865 | 3/1976 | Bierwas | 206/387 |
| 4,159,783 | 7/1979 | Crasnianski | 221/13 |
| 4,170,031 | 10/1979 | Beuch et al. | 360/98 |
| 4,173,427 | 11/1979 | Beuch et al. | 414/751 |
| 4,176,762 | 12/1979 | Scalera et al. | 221/81 |
| 4,185,057 | 3/1989 | Miller et al. | 369/37 |
| 4,300,040 | 11/1981 | Gould et al. | 235/381 |
| 4,331,242 | 5/1982 | Scott | 211/40 |
| 4,414,467 | 11/1983 | Gould et al. | 235/381 |
| 4,458,802 | 7/1984 | Maciver et al. | 194/205 |
| 4,519,522 | 5/1985 | McElwee | 221/13 |
| 4,566,087 | 1/1986 | Kraft | 369/37 |
| 4,609,232 | 9/1986 | Florence | 312/16 |
| 4,657,158 | 4/1987 | Faes et al. | 221/25 |
| 4,674,079 | 6/1987 | Agostini | 369/77.1 |
| 4,693,659 | 9/1987 | Burke et al. | 414/131 |
| 4,791,626 | 12/1988 | Staar | 369/37 |
| 4,811,323 | 3/1989 | d'Alayer de Costemore d'Arc et al. | 369/75.2 |
| 4,833,552 | 5/1989 | Agostini et al. | 360/92 |
| 4,901,172 | 2/1990 | Nakazawa et al. | 369/37 X |

FOREIGN PATENT DOCUMENTS 542027 12/1931 Fed. Rep. of Germany .

Primary Examiner—William M. Shoop, Jr.
Assistant Examiner—David Martin
Attorney, Agent, or Firm—Leydig, Voit & Mayer

[57] ABSTRACT

A changing apparatus for recording media has a rotatable magazine which houses a plurality of sloping storage slots in which recording media can be housed. The storage slots overlap one another in the circumferential direction of the magazine. A selector rotates the magazine until a desired storage slot is disposed in a loading position. A loading mechanism transfers a recording medium between the storage slot which is at the loading position and a pick-up which reads the information recorded in the recording medium.

20 Claims, 8 Drawing Sheets

AUTOMATIC CHANGING APPARATUS FOR A RECORDING MEDIUM

BACKGROUND OF THE INVENTION

This invention relates to an automatic changing apparatus for a recording medium, and more particularly but not exclusively, it relates to an automatic changing apparatus for compact discs used for the reproduction of music.

There exist in the marketplace a number of apparatuses which can store a plurality of recording media, such as compact discs, and automatically access and transfer information to or from a desired one of the recording media. These devices generally employ a circular magazine or carrousel which houses the recording media. The magazine can be either stationary or rotatable, and it can be either permanently mounted or removable from the apparatus.

In one type of conventional changing apparatus for compact discs, a plurality of compact discs are horizontally disposed around a circle atop a flat carrousel. The carrousel can be rotated to bring any one of the discs into alignment with a spindle, which can rotatably support a single disc while an optical pick-up reproduces information stored in the disc. While the disc is being rotated by the spindle, the disc remains inside the carrousel. This arrangement has the disadvantage that the discs are all disposed in a single horizontal plane, so only a very few discs can be housed in a small carrousel.

Another type of conventional changing apparatus has a plurality of discs which are vertically disposed in radial slots of a circular magazine. Each of the discs is aligned with a radius of the magazine. A disc player is disposed at the center of the magazine, and a desired disc can be transferred from inside the magazine to the disc player. While this arrangement enables a large number of discs to be stored within a magazine of small radius, since the discs are vertically disposed, the height of the apparatus must be at least as tall as the diameter of the discs, so the changing apparatus is undesirably bulky.

SUMMARY OF THE INVENTION

Accordingly, it is an object of the present invention to provide a changing apparatus which can store and manipulate a large number of recording media and which at the same time is extremely thin.

It is another object of the present invention to provide a changing apparatus which can be used for storing and manipulating a variety of recording media, including compacts discs, floppy discs, and cassette tapes.

It is yet another object of the present invention to provide a changing apparatus which can be operated either totally automatically or partly manually.

It is still another object of the present invention to provide a changing apparatus which can be economically manufactured.

It is a further object of the present invention to provide a changing apparatus which can be operated horizontally, vertically, or in any other attitude It is another object of the present invention to provide a changing apparatus which is portable.

A changing apparatus in accordance with the present invention employs a thin, annular magazine having a plurality of storage slots formed therein which are sloped with respect to the top and bottom sides of the magazine. The storage slots overlap one another in the circumferential direction of the magazine. As a result, even a very thin magazine can hold a large number of recording media, and the entire changing apparatus can be made very thin.

An information transfer device for reading information from or writing information on a recording medium is disposed at the center of the magazine, and a loading mechanism is provided which can transfer a recording medium between the magazine and the information transfer device.

The magazine can be either stationary or movable, but in preferred embodiments, the magazine is rotatable, either manually or by an electric motor. Preferably, the magazine is supported so that it can be easily removed from the changing apparatus.

The information transfer device can be any device for reading information from a recording medium, writing information onto a recording medium, or performing both operations. In preferred embodiments, the recording medium is a compact disc, and the information transfer device is an optical pick-up. However, the present invention can be adapted for use with a wide variety of recording media, including floppy discs for computers, optical cards, and cassette tapes. If the recording medium is a floppy disk, for example, the information transfer device can be a magnetic read/write head.

In a number of preferred embodiments, the loading mechanism is capable of transferring a recording medium between the magazine and the information transfer device regardless of the orientation of the changing apparatus. In another preferred embodiment, the magazine is disposed so as to rotate in a vertical plane, and the loading mechanism employs gravity to move a recording medium from the magazine to the information transfer device.

BRIEF DESCRIPTION OF THE DRAWINGS

In the figures, the same reference numerals indicate the same or corresponding parts.

DESCRIPTION OF THE PREFERRED EMBODIMENTS

Figure 1:
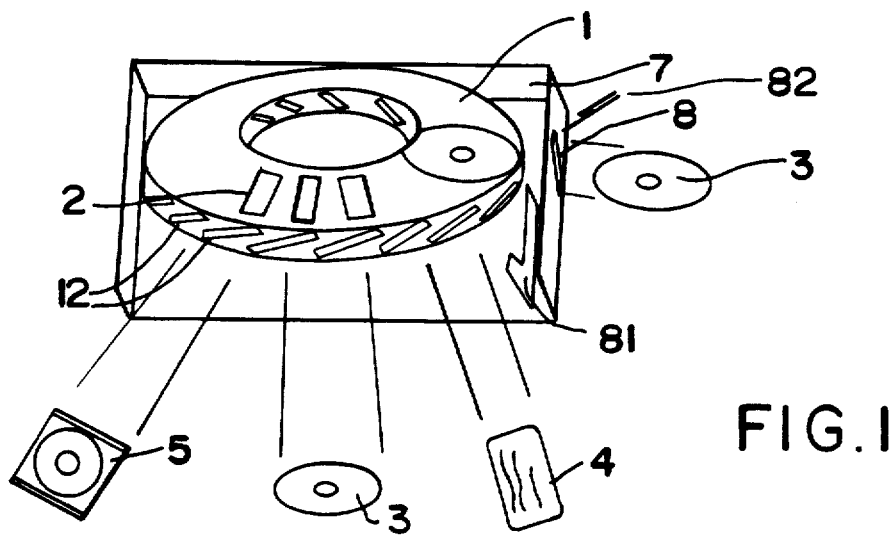
FIG. 1 is a schematic perspective view of the housing and magazine of a first embodiment of a changing apparatus in accordance with the present invention.

A number of preferred embodiments of a changing apparatus for in accordance with the present invention will be now described while referring to the accompanying drawings, FIGS. 1 through 10 of which illustrate a first embodiment. Since the illustrated embodiments are for handling a compact disc, a changing apparatus according to the present invention will be referred to as a "disc changer" for short. As shown in FIG. 1, which is a schematic perspective view of this embodiment, an annular magazine 1 for holding a plurality of compact discs 3 is rotatably mounted inside a rectangular housing 7. For the purpose of clarity, the front side and the top cover of the housing 7 have not been illustrated. The magazine 1 is constructed from an upper ring 9 and a lower ring 10 which are disposed in parallel and rigidly connected with one another by a plurality of sloping plates 11 which are uniformly spaced around the circumference of the magazine 1. The spaces between adjacent sloping plates 11 define a plurality of storage slots 12, each of which can house a single compact disc 3. However, as shown in FIG. 1, the storage slots 12 can also be used to hold other types of recording media such as optical cards 4, floppy discs 5, and cassette tapes. All of the storage slots 12 extend between the hole at the center of the magazine 1 and the outer periphery of the magazine 1. A disc 3 stored inside a slot 12 can be accessed from either end of the slot 12. The housing 7 has a diagonal loading slot 8 for the insertion and removal of compact discs 3 cut in one of its sides. The loading slot 8 is sloped with respect to the plane of the top of the magazine 1 by the same angle as the plates 11 so that any of the storage slots 12 in the magazine 1 can be aligned with the loading slot 8 by the rotation of the magazine 1. The loading slot 8 can be opened and closed by a sliding door 81 which is equipped with a handle and which is slidably mounted on the side of the housing 7. An ON-OFF switch 82 is mounted on the inside of the housing 7 in a position so as to be closed by the sliding door 81 when the sliding door 81 is completely shut.

The housing 7 is equipped with an unillustrated cover which has a window formed therein The upper ring 9 of the magazine 1 has identifying labels 2 affixed to its top surface which identify the discs 3 which are housed within the storage slots 12 of the magazine 1, and a single label 2 at a time can be read through the window. Each label 2 corresponds to one of the storage slots 12. The positions of the labels 2 are selected such that when one of the labels 2 is visible through the window, the corresponding storage slot 12 is aligned with the loading slot 8. The position which a disc 3 assumes when it is aligned with the loading slot 8 will be referred to as the loading position.

Figure 2:
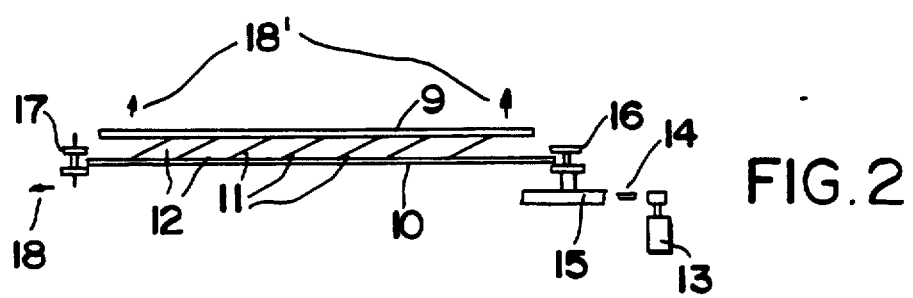
FIG. 2 is a showing the drive mechanism for the magazine.

As shown in FIG. 2, which is a side view of the magazine 1 of FIG. 1, the lower ring 10 of the magazine 1 is supported by a drive wheel 16 and a plurality of rotatable guide wheels 17 (only one of which is illustrated), each wheel having a circumferential groove formed therein into which the edge of the lower ring 10 fits. The drive wheel 16 is coaxially secured to a pulley 15, and the drive wheel 16 and the pulley 15 are together rotated by an electric motor 13 through a drive belt 14 which is wrapped around the pulley 15. The drive wheel 16 and the guide wheels 17 are pushed into contact with the outer peripheral surface of the lower ring 10 of the magazine 1 by an unillustrated tensioning mechanism so that the rotation of the drive wheel 16 by the motor 13 will be transmitted to the magazine 1 by friction. The magazine 1 can be easily removed from the housing 7 by pulling the guide wheels 17 outwards in the direction of arrow 18, thereby freeing the magazine 1, and then lifting the magazine 1 in the direction of arrows 18'.

Figure 3:
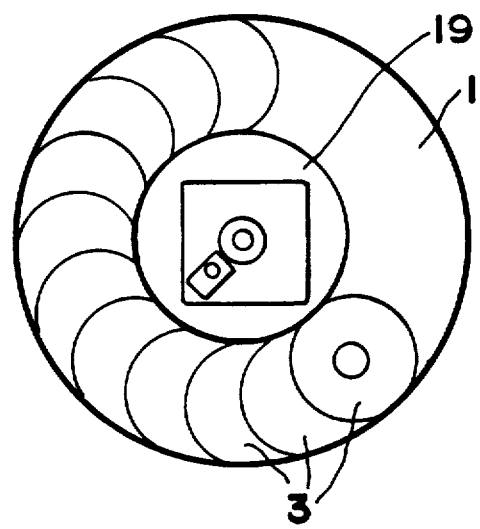
FIG. 3 is a schematic plan view of the magazine of FIG. 1, showing a plurality of compact discs arranged inside it.

As shown in the plan view of FIG. 3, an information transfer device in the form of a conventional optical pick-up 19 for reading information from compact discs 3 is mounted on the bottom of the housing 7 at the center of the magazine 1. The magazine 1 can hold a plurality of compact discs 3 equal to the number of storage slots 12 in the magazine 1. When placed inside the storage slots 12, each disc 3 is physically separated from the adjacent disc 3 but overlaps it in the circumferential direction of the magazine 1. The optical pick-up 19 is electrically connected to an unillustrated output jack by means of which the pick-up 19 can be connected to an external device such as an amplifier, ear phones, or audio speakers when the compact discs 3 contain music.

Figure 5:
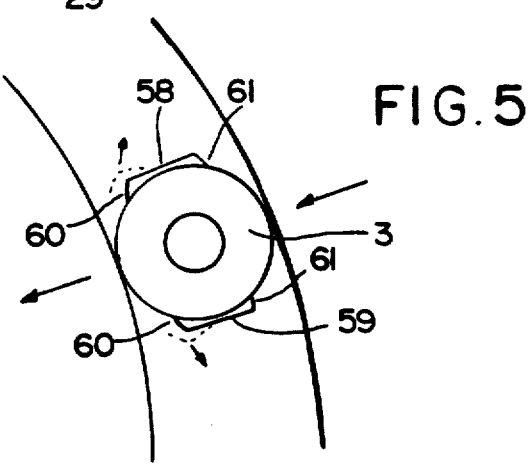
FIG. 5 is a schematic plan view of a mechanism for centering a disc in one of the storage slots in the magazine.

As shown in FIG. 5, each disc 3 is supported inside the corresponding storage slot 12 by a pair of resilient fingers 58 and 59 having bent outer ends 60 and 61 which grasp the disc 3 along its periphery from opposite sides and lightly restrain it from movement in the radial direction as well as center it within the storage slot 12. The fingers 58 and 59 are flexible enough to permit easy insertion and removal of a disc 3 from a storage slot 12, yet they are rigid enough to prevent the radial or vertical movement of a disc 3 when the magazine 1 is rotated or tilted. The fingers 58 and 59 can be made of any suitably resilient material. If the sloping plates 11 are made of plastic, the fingers 58 and 59 can be integrally molded with the sloping plates 11. Alternatively, they may be thin strips which are attached to the sloping plates 11.

Figure 4:
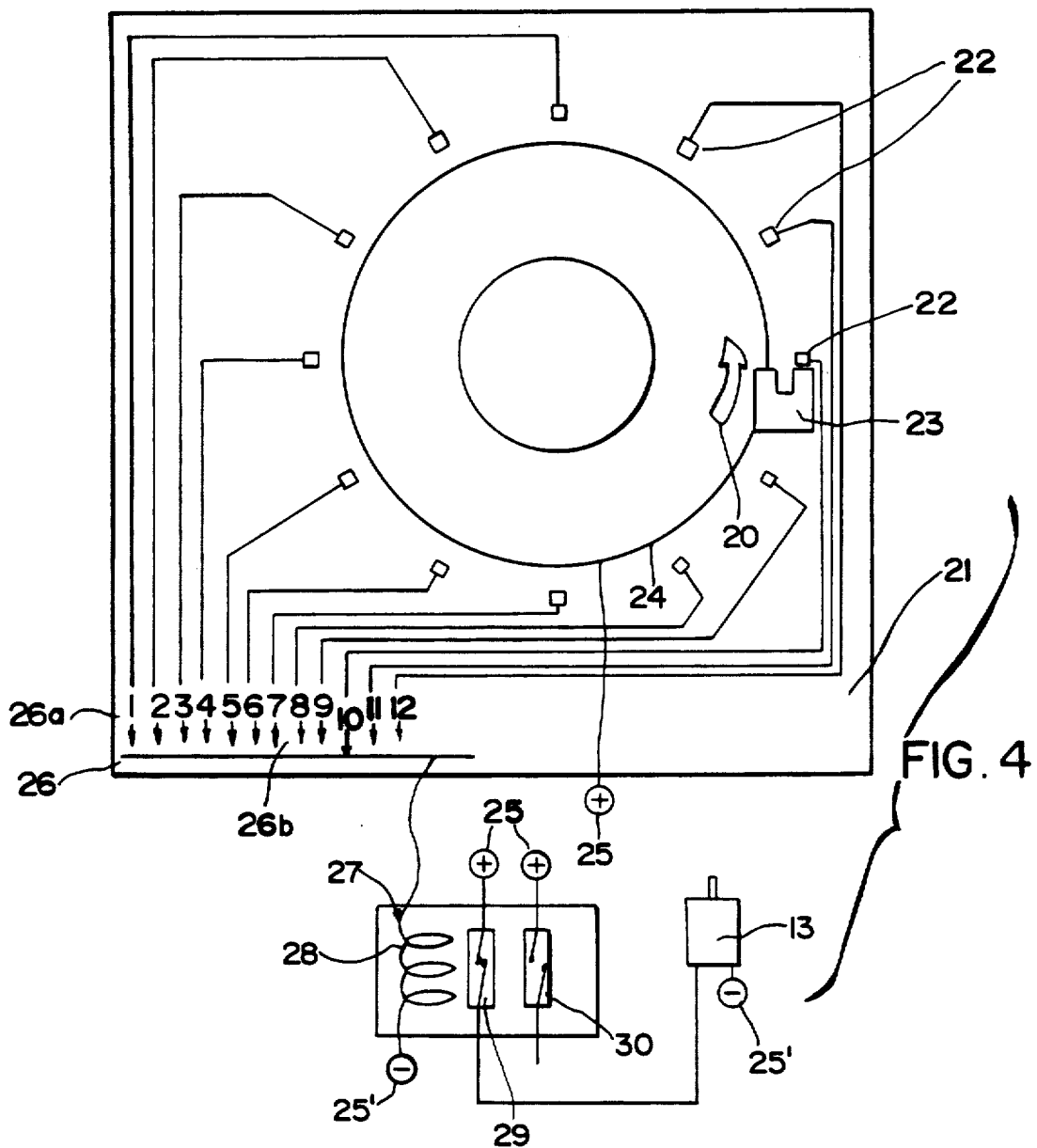
FIG. 4 is a schematic plan view of a mechanism for controlling the rotation of the magazine of FIG. 3.

FIG. 4 illustrates a portion of a selector mechanism for controlling the rotation of the magazine 1 so that a desired disc 3 in the magazine 1 can be brought to the loading position opposite the loading slot 8. An electrically-insulating base 21 is mounted on the lower inner surface of the housing 7 beneath the magazine 1. A circular electrically-conducting strip 24 is formed atop the base 21. The strip 24 is connected to a positive terminal 25 of an unillustrated DC power supply. Around the periphery of the circular strip 24, a plurality of equally-spaced stationary electrical contacts 22 are formed on the top surface of the base 21. The number of contacts 22 equals the number of storage slots 12 in the magazine 1. The present embodiment employs twelve storage slots 12 and twelve contacts 22, but the number is completely arbitrary. Each of the contacts 22 is electrically connected to a corresponding movable contact 26a of a switch 26. Each movable contact 26a can be switched between an open position and a closed position In the closed position, the movable contact 26a connects the corresponding contact 22 to a stationary contact 26b. The stationary contact 26b is connected to the negative terminal 25' of the power supply through a solenoid coil 28 of a switching device 27 having two switches 29 and 30. Switch 29, which is closed except when solenoid 28 is energized, is connected between a positive terminal of the power supply and the positive terminal of the motor 13 for rotating the magazine 1. Switch 30, which is open except when solenoid 28 is energized, is connected between a positive terminal of the power supply and a motor 31 for rotating a cam. Upon closing, switch 30 commences a cycle of a loading mechanism described further below.

A U-shaped, electrically-conducting wiper arm 23 is secured to the bottom side of the magazine 1 and rotates therewith in the direction of arrow 20. One section of the wiper arm 23 is in constant contact with the circular strip 24, while the other section of the wiper arm 23 contacts each of contacts 22 one at a time as the wiper arm 23 rotates around the strip 24.

Figure 6:
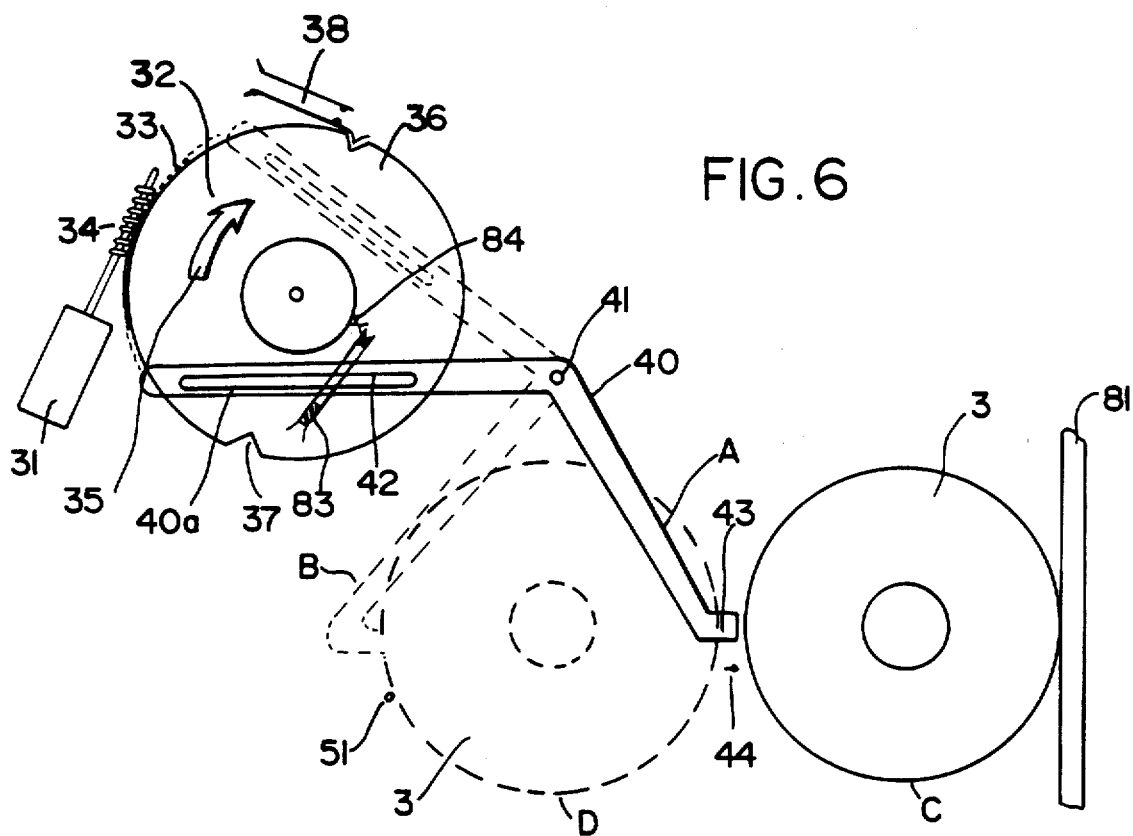
FIG. 6 is a schematic plan view and FIG. 7 is a schematic side view of a mechanism for removing a disc from the magazine and placing it onto a spindle.
Figure 7:
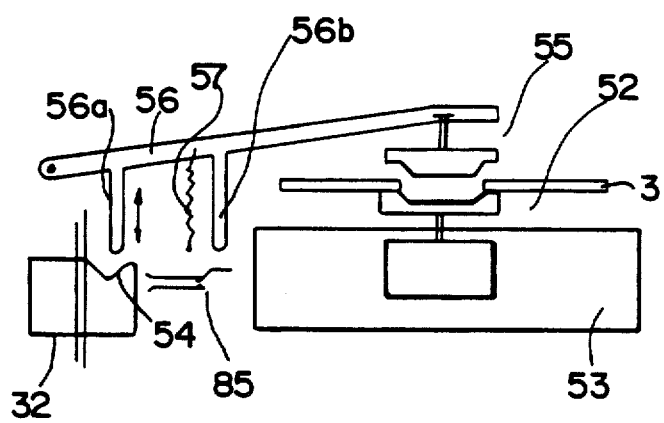

FIG. 6 is a plan view of a loading mechanism for removing a compact disc 3 from the magazine 1 and placing it on a spindle 52, which is illustrated in FIG. 7. A horizontally-disposed, disk-shaped cam 32 is rotatably mounted on the bottom of the housing 7 inside the central hole of the magazine 1. The cam 32 has gear teeth 33 formed on its outer periphery, and these gear teeth 33 engage with a worm 34 formed on the output shaft of an electric motor 31 so that when the electric motor 31 is operated, the cam 32 will rotate in the direction of arrow 35. The motor 31 is supplied current via switch 30 of FIG. 4, so that it can start when the solenoid coil 28 is energized. The cam 32 has two diametrically opposed notches 36 and 37 formed in its periphery. A switch 38 is disposed in the vicinity of the cam 32. It has a stationary contact and a movable contact with a bent section which is biased against the outer surface of the cam 32. When the cam 32 is rotated so that one of the notches 36 or 37 coincides with the bent section of the movable contact, the switch 38 opens, while at other times it remains closed.

Figure 8A:
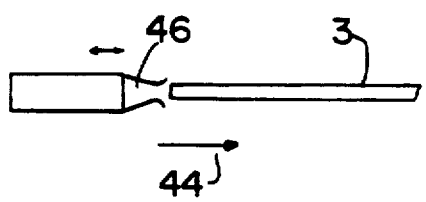
FIGS. 8a through 8f are schematic side views of three different types of clamps for grasping a disc for use in the embodiment of FIG. 6.
Figure 8B:
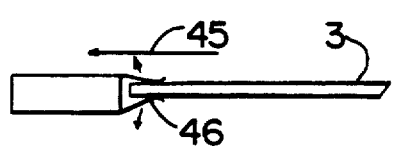
Figure 8C:
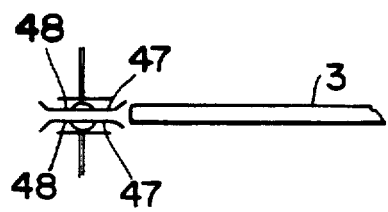
Figure 8D:
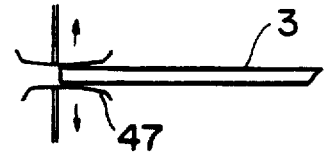
Figure 8E:
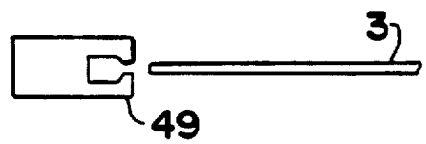
Figure 8F:
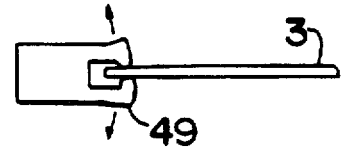

A lever 40 is pivotably mounted on a pin 41 which is secured to the bottom of the housing 7. The left end of the lever 40 in FIG. 6 has a longitudinally-extending slot 40a formed therein which loosely fits over a pin 42 which is secured to the top surface of the cam 32. A single rotation of the cam 32 causes the lever 40 to pivot back and forth between a position A shown by the solid lines and a position B shown by the dashed lines in FIG. 6. The other end 43 of the lever 40 has a clamp formed thereon which is capable of grasping the edge of a disc 3. The clamp need not have any particular structure, and it is only necessary for it to be able to grasp and release a disc 3 with the application of a small force. FIG. 8 illustrates several examples of clamps which can be employed. FIGS. 8a and 8b show a clamp comprising a pair of leaf springs 46 having upturned ends. The springs 46 are biased towards one another and can bend towards and away from one another to grasp or release the outer edge of a disc 3. When the clamp is moved towards the disc in the direction of arrow 44 and is pressed against the disc 3, the springs 46 separate and grasp the edge of the disc 3. When the clamp is moved back in the direction of arrow 45 as shown in FIG. 8b, the disc 3 is pulled out of the magazine 1 by the clamp. FIGS. 8c and 8d show a clamp comprising a pair of disks 47 which have upturned edges and which are biased towards one another by a pair of leaf springs 48. The disks 47 can move towards and away from one another to grasp or release a disc 3. When the clamp is pushed against the edge of a disc 3, the discs 47 of the clamp are made to separate from one another against the force of the leaf springs 48 and then are pressed against the top and bottom surface of the disc 3 by the leaf springs 48. FIGS. 8e and 8f illustrate a U-shaped clamp made from flexible molded plastic When the clamp is pressed against the edge of a disc 3, the jaws 49 of the clamp bend outwards as shown by the arrows in FIG. 8f and hold a disc 3 therebetween.

Returning to FIG. 6, a second cam 84 is secured to the center of cam 32 so as to rotate therewith. Cam 84 has an outwardly-extending projection formed thereon. A switch 83, which controls the supply of current to motor 13 for rotating the magazine 1, is operated by the cam 84. Switch 83 remains open except when the projection of cam 84 comes into contact with a bent portion of switch 83. The projection on cam 84 is located such that it will close switch 83 only when the cam 32 is in a position such that the lever 40 is in position A of FIG. 6. Thus, motor 13 can be supplied current so as to rotate the magazine 1 only when there is no disc 3 on the spindle.

As the lever 40 pivots back and forth between positions A and B, it carries a disc 3 with it between a position C, in which the disc 3 is housed in a storage slot 12 of the magazine 1, and a position D, in which it is mounted on a spindle. The movement of the disc 3 to the left of position D is prevented by a vertical pin 51 which is secured to the electrically-insulating base 21. When the sliding door 81 is closed, the disc 3 is prevented from being pushed to the right of position C by the side of the sliding door 81.

When a disc 3 is being played, it is held between a rotating spindle 52 and a rotatable centering hub 55, which are illustrated in FIG. 7. The spindle 52 is rotated by a motor 53. The spindle 52 and the centering hub 55 grasp the disc 3 sufficiently firmly that it can be rotated regardless of the orientation of the disc changer with respect to the horizontal. The centering hub 55 can be moved towards and away from the spindle 52 by a pivotably-supported lever 56. The lever 56 is biased in the clockwise direction in FIG. 6 (towards the spindle 52) by a tension spring 57. The lever 56 has two rods 56a and 56b formed thereon which extend transversely from the main portion of the lever 56. The lower end of rod 56a is in constant contact with the top surface of the cam 32. The cam 32 has a circumfentially-extending groove 54 formed in a portion of its top surface into which rod 56a enters when the cam 32 is rotated to a suitable position. When rod 56a is in contact with a portion of the top surface of the cam 32 other than the groove 54, the lever 56 is held in the raised position shown in FIG. 7, and when rod 56a is in contact with the groove 54, the lever 56 is pivoted clockwise by the spring 57 to its lowered position. In this position, the centering hub 55 holds the disc 3 against the spindle 52.

The second rod 56b has a lower end which operates a switch 85 which controls the current to the spindle motor 53. When the lever 56 is in a raised position, switch 85 is open, and when the lever 56 pivots to a lowered position, switch 85 is closed by the lower end of rod 56b.

FIG. 9 illustrates another example of a clamp for grasping a disc 3. This clamp is especially advantageous in that it can handle a disc 3 extremely gently. A leaf spring 88 having roughly a crank shape in profile and roughly an L shape in plan is secured to the end 43 of the lever 40 by a screw 87. A leg portion 89 of the spring 88 has an upwardly sloping surface 90 formed along one edge thereof. Two rubber contacts 91 and 92 for grasping a disc 3 are mounted on confronting surfaces of the spring 88 and the end 43 of the lever 40. The separation between the two contacts 91 and 92 is normally smaller than the thickness of a disc 3. A pin 93 for operating the clamp is mounted on a stationary portion of the disc changer.

Figure 9A:
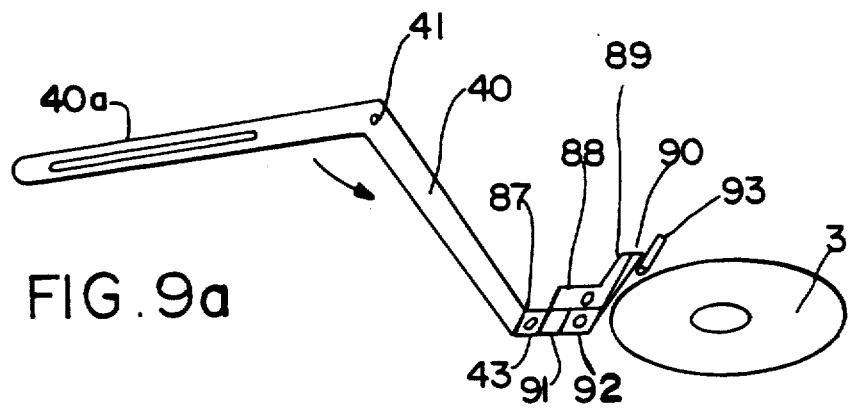
FIGS. 9a–9d are schematic perspective views showing the operation of another type of clamp for grasping a disk.
Figure 9B:
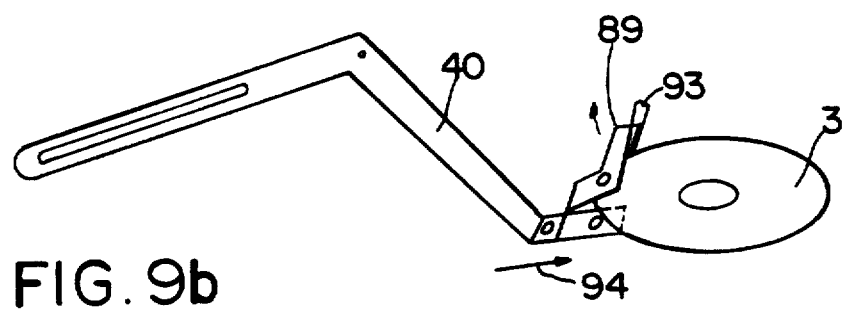
Figure 9C:
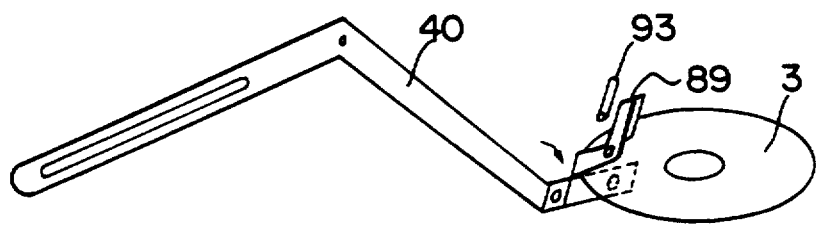
Figure 9D:
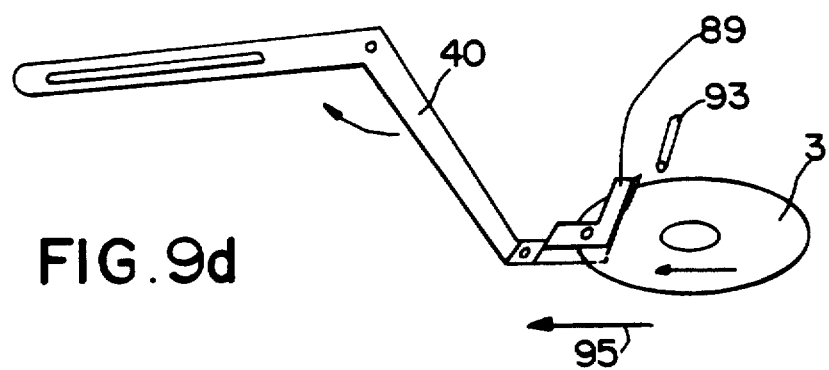

The operation of this clamp is illustrated in FIGS. 9a–9d. FIG. 9a shows the lever 40 being pivoted in the counterclockwise direction towards a disc 3 which is housed in the magazine 1. As shown in FIG. 9b, when the end 43 of the lever 40 nears the disc 3, the sloping surface 90 of the leg portion 89 of the spring 88 rides up onto the pin 93, and the leaf spring 88 is pivoted upwards. The rubber contacts 91 and 92 are thereby separated from one another far enough for the edge of the disc 3 to pass therebetween without touching the contacts. As shown in FIG. 9c, the further counterclockwise pivoting of the lever 40 causes the leg portion 89 of the leaf spring 88 to pass completely over the pin 93. Therefore, the leaf spring 88 pivots back towards the end 43 of the lever 40 and the disc 3 is held firmly between the rubber contacts 91 and 92. When the lever 40 is rotated back in the clockwise direction, the disc 3 is pulled out of the magazine 1 in the direction of arrow 95. At this time, the sloping surface 90 of the spring 88 passes underneath the pin 93, so the clamp remains closed.

Near the end of the clockwise movement of the lever 40 towards position B of FIG. 6, the edge of the disc 3 will come into contact with pin 51. As the lever 40 continues to pivot clockwise, the rubber contacts 91 and 92 will slide off the disc 3 and the disc 3 will be freed.

At a later point in time, when the lever 40 is again pivoted in the counterclockwise direction to return the disc 3 to the magazine 1, the clamp will push the edge of the disc 3 without opening.

Figure 10:
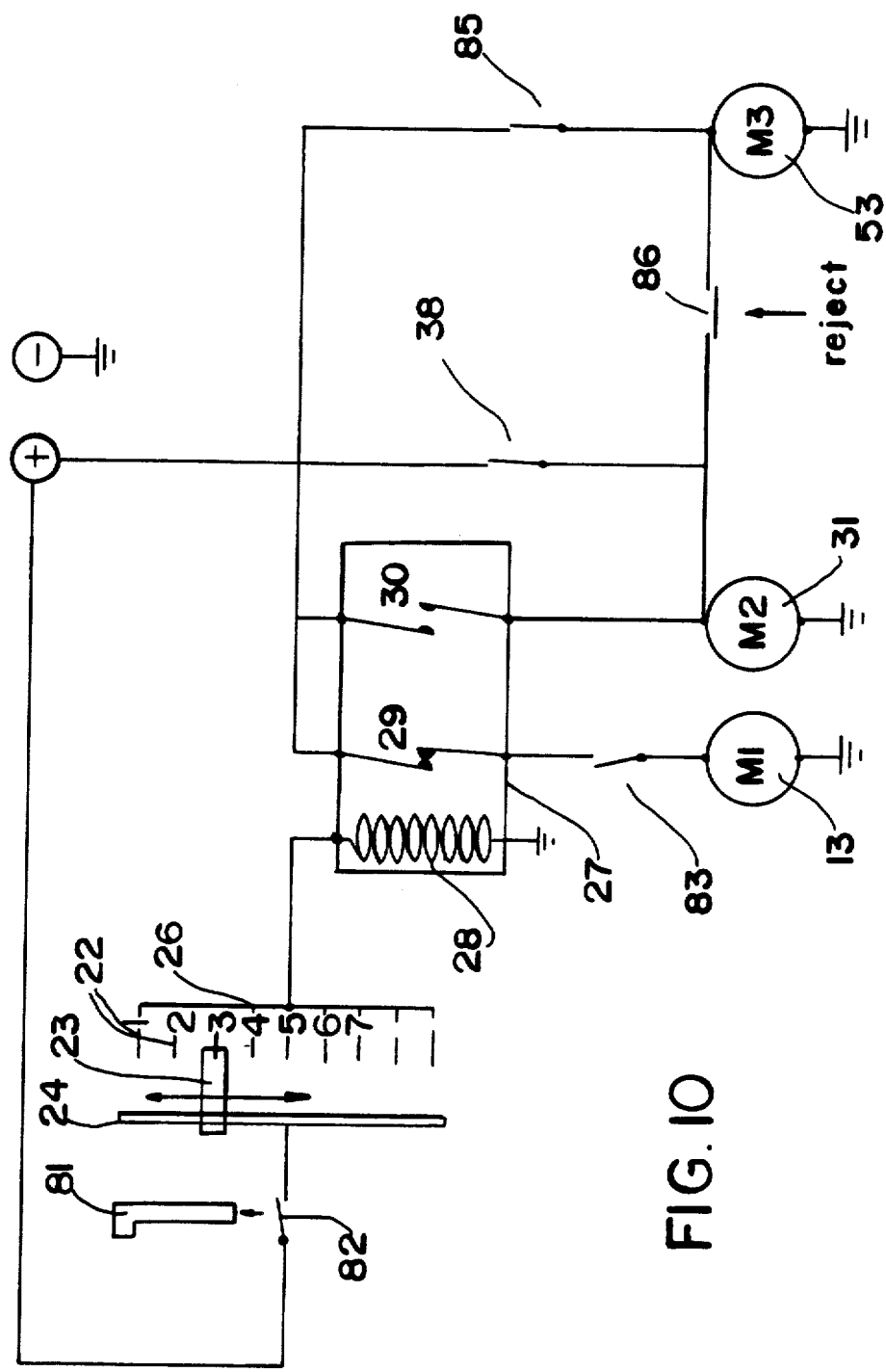
FIG. 10 is a schematic diagram of an example of a control circuit for controlling the operation of the changing apparatus.

The operation of the illustrated embodiment will now be described with reference to FIG. 10 which schematically illustrates one example of a control circuit for the disc changer. In addition to the elements already described, the control circuit includes a reject switch 86 which can be momentarily closed to interrupt the playing of a disc 3 and return it to the magazine 1.

It will be assumed that the lever 40 is initially in position A of FIG. 6. In this state, switch 38 is open and switch 83 is closed. When the operator of the changing apparatus desires to listen to a certain disc 3 which is housed within the magazine 1, he closes the contact 26a of selector switch 26 corresponding to the storage slot 12 which houses the disc 3. The magazine 1 is rotated by the motor 13 until the wiper arm 23 reaches the contact 22 which is connected to the closed contact 26a. At this time, the wiper arm 23 forms an electrical connection between the circular strip 24 and the contact 22, so current flows from the circular strip 24 to the solenoid 28 via the wiper arm 23, contact 22, and the closed contact 26a. The excitation of the solenoid 28 opens switch 29, which cuts off the supply of current to motor 13.

At the same time that it opens switch 29, the solenoid 28 closes switch 30 and a pulse of current is supplied to motor 31. When motor 31 is turned on, it rotates the cam 32 through the worm 34 and gear teeth 33 in the direction of the arrow 35. As soon as the cam 32 begins to rotate, switch 83 opens and switch 38 closes.

Even though the motor 13 is momentarily stopped by the opening of switch 29, the momentum of the magazine 1 causes the magazine 1 to continue rotating, and the wiper 23 is carried past contact 22. When the wiper 23 and the contact 22 separate, the solenoid 28 is deenergized, and switch 29 and 30 return to the states shown in FIG. 10. However, switch 83 is now open, so motor 13 remains off and the magazine 1 stops in a location such that the disc 3 which was selected by the operator is in the loading position. Furthermore, switch 38 is now closed, so motor 31 continues to run even through switch 30 is open.

Motor 31 will rotate from the position shown in FIG. 6 for a half cycle until notch 37 coincides with switch 38, upon which switch 38 is made to open, thereby stopping motor 31.

As the cam 32 rotates a half cycle, lever 40 first pivots slightly counterclockwise from the position shown in FIG. 6 and the clamp is pressed against the edge of the disc 3. The disc 3 is prevented from rightward movement by the side of the sliding door 81, so the force of the clamp against the disc 3 causes the clamp to open and grasp the edge of the disc 3. The lever 40 then pivots clockwise towards position B. The grasping force exerted by the clamp is strong enough to pull the disc 3 out of the fingers 58 and 59 in the magazine and to position D.

When the disc 3 reaches position D, its further movement is prevented by the fixed pin 51. When the disc 3 strikes the pin 51, the lever 40 continues to pivot slightly further in the clockwise direction, as a result of which the clamp slips off the edge of the disc 3 and the disc 3 is released In order to move the disc 3 back and forth between position C and position D, the lever 40 must pass between the centering hub 55 and the spindle 52. Accordingly, the motion of lever 56 is coordinated with the movement of lever 40 by the groove 54 in the cam 32 so that the centering hub 55 will be raised at the appropriate time and then lowered when the disc 3 is correctly positioned atop the spindle 52.

When the disc 3 reaches position D, rod 56a of lever 56 moves downwards into the groove 54 in the cam 32 and lever 56 pivots downwards until the centering hub 55 holds the disc 3 atop the spindle 52. At the same time, rod 56b moves downwards to close switch 85. As shown in FIG. 10, when switch 85 is closed, the spindle motor 53 is supplied current and begins to rotate. The closing of switch 85 also activates the optical pick-up 19, which reads information from the rotating disc 3.

When the optical pick-up 19 finishes reading the disc 3 or when the user presses the reject button 86, an electrical pulse is applied to motor 31, which begins to rotate the cam 32 in the clockwise direction. As soon as the cam 32 starts to rotate, switch 38 closes and supplies current to motor 31. The cam 32 rotates for one half cycle until notch 36 again reaches the position of switch 38, and switch 38 opens to stop motor 31. As the cam 32 rotates one half cycle, the lever 40 pivots from position B to position A of FIG. 6. As it does so, the clamp of the lever 40 pushes the disc 3 to the right rather than actually grasping it, the force between the disc 3 and the clamp not being large enough to open the jaws of the clamp. When the disc 3 reaches position C, it it once again held inside the storage slot 12 by fingers 58 and 59.

When the cam 32 stops in the position shown in FIG. 6, the projection on cam 84 once again closes contact 83 to enable current to again be supplied to motor 13.

Figure 11:
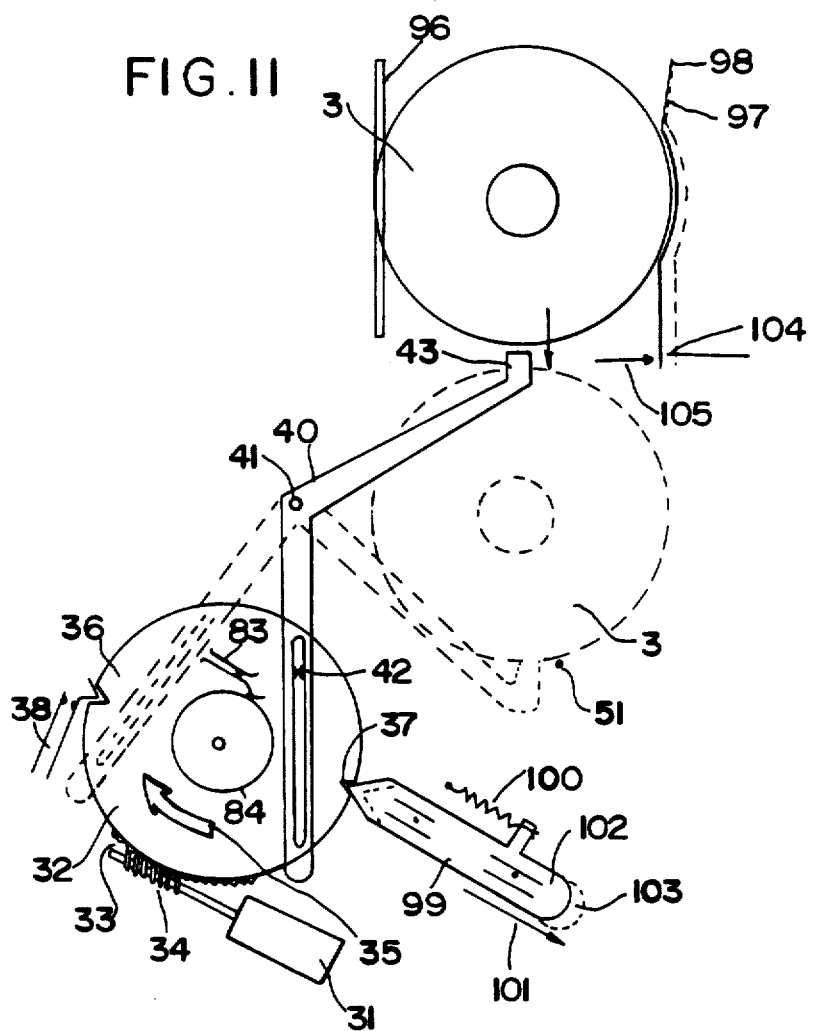
FIGS. 11 and 12 are respectively a front elevation and a side elevation of a mechanism for removing a disc from the magazine and placing it onto a spindle for an embodiment in which the magazine is vertically disposed.
Figure 12:
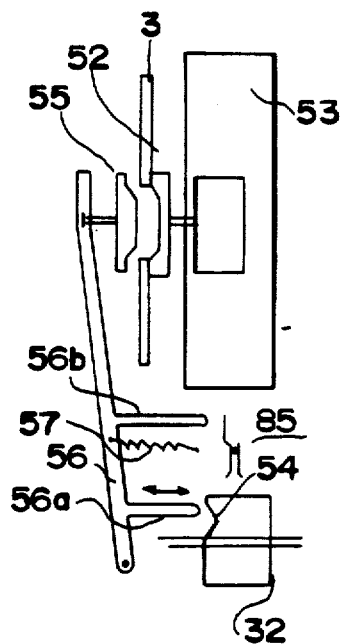

The embodiment of FIGS. 1 through 10 can be operated regardless of the orientation of the magazine 1 with respect to the horizontal. However, if the disc changer is to be mounted on a wall, for example, so that the magazine 1 is always rotated in a vertical plane, it is possible to transfer a disc 3 from the magazine to a spindle 52 by means of gravity, and it is not necessary for the end 43 of the lever 40 to be equipped with a clamp for grasping the edge of a disc 3. FIGS. 11 and 12 are respectively a front elevation and a side elevation of portions of another embodiment of a disc changer in which an unillustrated magazine 1 always rotates in a vertical plane. The magazine 1, the optical pick-up 19, and the control circuit for this embodiment are substantially the same as for the previous embodiment, so they have not been illustrated.

Each storage slot 12 in the unillustrated magazine 1 has a pair of rails 96 and a leaf spring 97 mounted therein for supporting a disc 3. One edge of a disc 3 can slide between the rails 96, and the opposite edge of the disc 3 fits into a concave portion of the leaf spring 98. One end 98 of the leaf spring 97 is secured to the inside of the slot 12, while the other end can be moved in the direction of arrow 105 between a position shown by the solid line in which the concave portion presses against the disc 3 and a position shown by the dashed line in which the concave portion is separated from the disc 3 and the disc 3 is free to fall downwards from the slot 12.

The leaf spring 97 is connected by a link 104 to a sliding finger 99 which is mounted adjacent to cam 32. One end of the sliding finger 99 is pointed so as to be able to fit into notches 36 or 37 of the cam 32. This end of the sliding finger 99 is biased towards the periphery of the cam 32 by a tension spring 100. The sliding finger 99 can slide between a position 102, shown by the solid lines, in which the pointed end fits into one of notches 36 and 37, and a position 103, shown by the dashed lines, in which the pointed end is in contact with the outer periphery of the cam 32. When the sliding finger 99 is in position 102, the leaf spring 97 presses against the edge of disc 3 and holds it inside the slot 12. When the sliding finger 99 moves outwards to position 103, the link 104 pulls the leaf spring 97 away from the disc 3 to the position shown by the dashed line.

The process by which a desired disc 3 is brought to the loading position is the same as for the previous embodiment. When the desired disc 3 reaches the loading position, motor 31 is activated and cam 32 begins to turn in the direction of arrow 35. As soon as it begins to turn, notch 37 pushes the sliding finger 99 outwards in the direction of arrow 101 from position 102 to position 103, and the leaf spring 97 is moved outwards by the link 104 in the direction of arrow 105. As a result, the disc 3 is freed from the slot 12 and falls onto the end 43 of the lever 40. The lever 40 then descends, and gravity carries the disc 3 downwards while supported by the lever 40 to the position shown by the dashed lines. In this position, it is rotated by the spindle mechanism shown in FIG. 12, which except for its vertical orientation is substantially identical to the spindle mechanism of FIG. 7.

The end 43 of the lever 40 only has to support the disc 3 rather than grasp it, so it does not need to be equipped with a clamp.

When the reproduction of information on the disc 3 has been completed, the cam 32 is again rotated for a half cycle. At this time, the lever 40 is rotated upwards, and the end 43 of the lever 40 pushes the disc 3 back into the storage slot 12. When the lever 40 reaches the end of its upward travel, the sliding finger 99 again engages with notch 37 and the leaf spring 97 is able to pivot back to a position in which it restrains the disc 3 in the storage slot 12.

Figure 13:
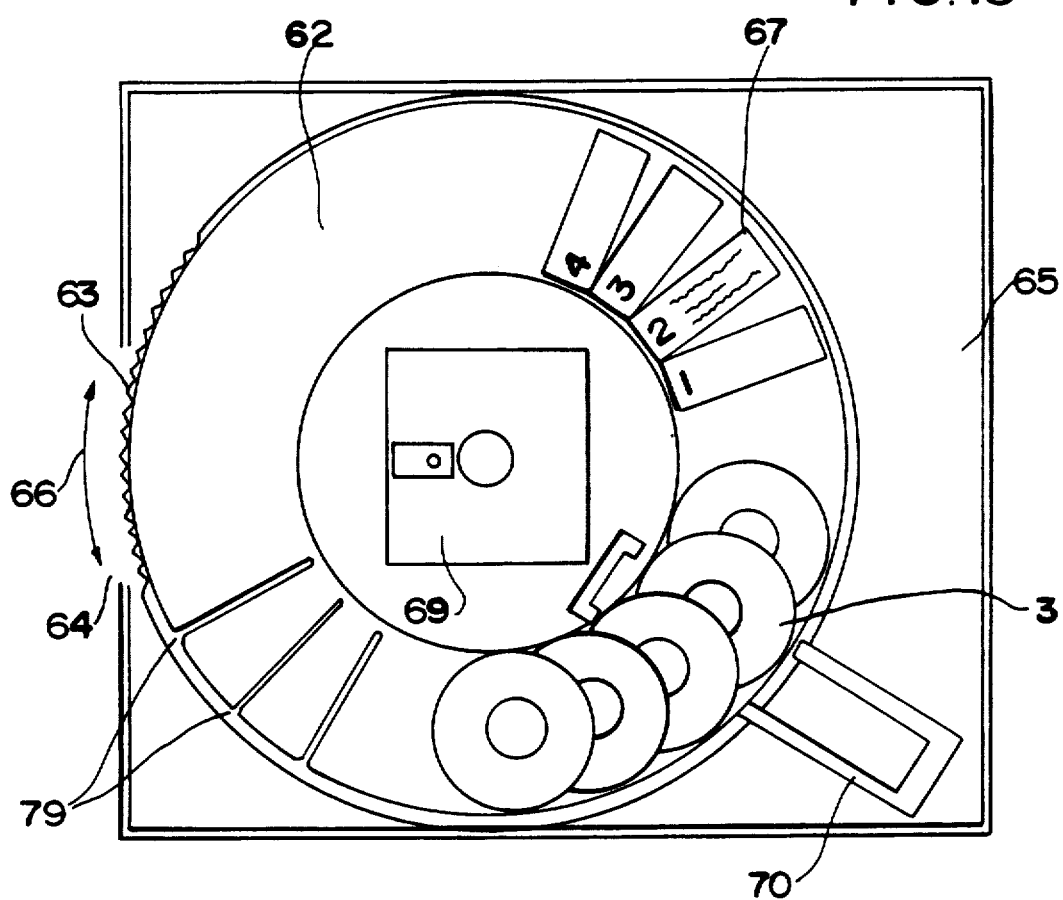
FIG. 13 is a schematic plan view of another embodiment of the present invention in which the magazine can be manually rotated.
Figure 14:
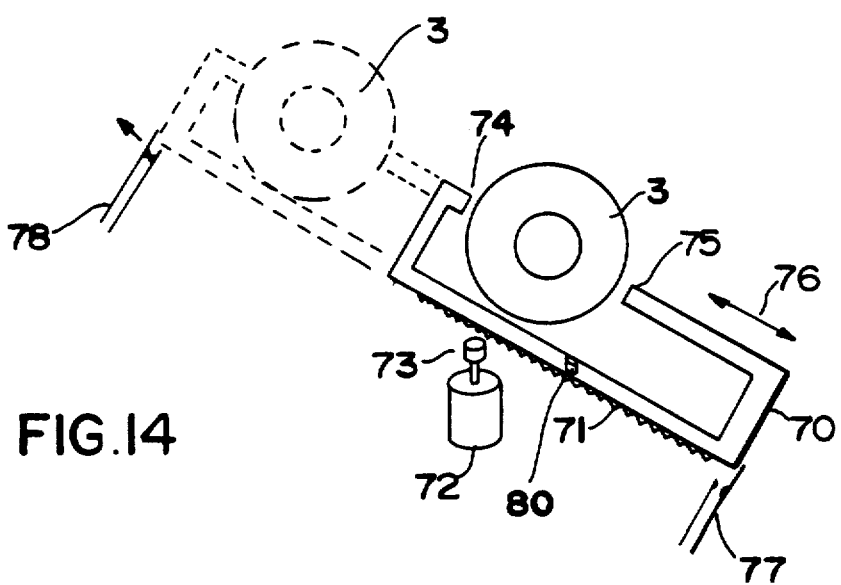
FIG. 14 is a schematic plan view showing a mechanism for removing a disc from the magazine of FIG. 13 and placing it on an unillustrated spindle.

FIGS. 13 and 14 illustrate another embodiment of the present invention which can be operated partly manually. As in the previous embodiment, a magazine 62 is rotatably mounted inside a rectangular housing 65 having a loading slot 64 in one side through which discs 3 can be inserted into the magazine 62. The magazine 62 has a plurality of unillustrated storage slots formed therein which are sloped with respect to the top and bottom sides of the magazine 62 and overlap in the circumferential direction thereof. Instead of being rotated by a motor, however, the magazine 62 is supported so that it can be manually rotated by the operator of the disc changer. In order to make the magazine 62 easy to turn by hand, knurling 63 is formed on its outer periphery. The magazine 62 can be rotated in either direction, as shown by the two-headed arrow 66. The top surface of the magazine 62 has a plurality of radially-extending slits 79 formed therein, corresponding in number to the number of storage slots for discs 3 in the magazine 62. Labels 67 which identify the discs 3 which are stored in the magazine 62 are attached to the top surface of the magazine 62 in prescribed locations. The labels 67 can be viewed one at a time through an unillustrated window formed in the cover of the housing 65. An optical pick-up 69 is mounted at the center of the magazine 62.

FIG. 14 illustrates a simple mechanism for loading a disc 3 onto an unillustrated spindle of the embodiment of FIG. 13. It includes a rectangular loading frame 70 having a gap formed therein. The ends 74 and 75 of the frame 70 which define the gap confront a disc 3 from opposite sides. The frame 70 is slidably mounted so as to be able to move radially towards and away from the center of the magazine 62 as shown by arrow 76. The frame 70 has a rack 71 formed on one side thereof which engages with a pinion 73 which is mounted on the output shaft of an electric motor 72. Two limit switches 77 and 78 are disposed at the radially outer and inner ends of the path of movement of the frame 70. A vertical pin 80 is secured to the top side of the frame 70 and projects upwards therefrom. When the frame 70 is in the position shown by the phantom lines in FIG. 9, the pin 80 engages with one of the slits 79 in the magazine 62 and prevents the magazine 62 from being rotated. A simple reversing device can be used to control the direction of rotation of the motor 72.

In order to operate this embodiment, the operator rotates the magazine 62 by hand until the label 67 corresponding to the disc 3 which he wishes to listen to appears in the window of the cover of the housing 65. At this time, the corresponding disc 3 is positioned inside the gap in the frame 70. The operator then turns on the motor 72, and through the rack 71 and the pinion 73, the motor 72 causes the loading frame 70 to move radially inwards from the position shown by the solid lines in FIG. 14 to the position shown by the phantom lines until the frame 70 contacts the inner limit switch 78, and the motor 72 is automatically stopped. In this position, the disc 3 is mounted on an unillustrated spindle, and the spindle rotates the disc 3 while the pick-up reads information from the disc 3. Throughout the time that the disc 3 is being played, the frame 70 remains in this position. When the disc 3 has finished playing and it is desired to return the disc 3 to the magazine 62, the motor 72 is operated in the opposite direction, and the frame 70 is moved radially outwards until it contacts and opens the outer limit switch 77. The operator can then manually rotate the magazine 62 to select another disc 3.

This embodiment may also be equipped with an electrical interlock which prevents the operation of the motor 72 while the magazine 62 is being rotated.

Although this embodiment employs a motor 72 to load and unload a disc 3, it also possible for the frame 70 to be manually operated.

The loading and unloading mechanism of FIG. 14 can also be used with the embodiments illustrated in FIGS. 6 and 11.

What is claimed is:

1. A changing apparatus for a recording medium comprising:
   an annular storage magazine having top and bottom sides and having a plurality of storage slots for storing recording media formed therein, the storage slots being sloped with respect to the top and bottom sides of the magazine and overlapping one another in the circumferential direction of the magazine;
   an information transfer device for reading information from or writing information onto a recording medium; and
   a loading device for transferring a recording medium between one of said storage slots in said magazine and a location where said information transfer device can read from or write onto the recording medium.

2. A changing apparatus as claimed in claim 1 wherein said magazine comprises:
   an upper ring and a lower ring which are parallel to one another; and
   a plurality of partitions which extend between and are secured to the upper and lower rings, each of the partitions being sloped with respect to the planes of the upper and lower rings and overlapping in the circumferential direction of the magazine.

3. A changing apparatus as claimed in claim 2 wherein said magazine further comprises a centering device for centering a recording medium in each of said storage slots.

4. A changing apparatus as claimed in claim 3 wherein said centering device comprises a pair of resilient fingers which are secured to said partitions on opposite sides of each storage slot so as to grasp a recording medium in the storage slot from the sides of the recording medium.

5. A changing apparatus as claimed in claim 4 wherein said fingers and said partitions are integral molded members.

6. A changing apparatus as claimed in claim 1 further comprising support means for rotatably supporting said magazine.

7. A changing apparatus as claimed in claim 6 wherein said magazine can be manually rotated.

8. A changing apparatus as claimed in claim 6 further comprising a drive motor which is drivingly connected to said magazine so as to rotate said magazine.

9. A changing apparatus as claimed in claim 6 wherein said support means enables said magazine to be removed therefrom.

10. A changing apparatus as claimed 8 further comprising a selector for generating a signal which stops said electric motor from rotating said magazine when a prescribed one of said slots reaches a prescribed loading position where a recording medium contained in the prescribed slot can be accessed by said loading device.

11. A changing apparatus as claimed in claim 10 wherein said selector comprises:
    a circular electrically-conducting member which is disposed parallel to one side of said magazine;
    a plurality of electrical contacts equal in number to said storage slots in said magazine which are disposed along a circle which is concentric with said circular electrically-conducting member;
    an electrically-conducting wiper arm which is secured to said magazine so as to rotate therewith, which is in constant electrical contact with said circular electrically-conducting member, and which contacts each of said contacts one at a time as it rotates with said magazine; and
    a plurality of switches, each of which is connected to one of said contacts and can move between an open and a closed position.

12. A changing apparatus as claimed in claim 1 wherein said loading device comprises:
    a rotatable cam which is disposed inside the center of said magazine; and
    a pivotable lever which is connected to said cam so that when said cam makes a single rotation, said lever pivots back and forth between a first position in which one end of said lever is disposed in the vicinity of a storage slot in said magazine and a second position in which said one end of said lever is disposed in the vicinity of said information transfer device.

13. A changing apparatus as claimed in claim 12 wherein said loading device further comprises a clamp which is mounted on said one end of said lever and which can grasp the edge of a recording medium.

14. A changing apparatus as claimed in claim 1 wherein said loading device comprises a frame having two ends which define a gap which is large enough to hold a recording medium, said frame being movable between a first position in which the gap in said frame is disposed in one of said storage slots of said magazine and a second position in which the gap is disposed in the vicinity of said information transfer device.

15. A changing apparatus as claimed in claim 14 wherein said frame can be moved manually between the first and second positions.

16. A changing apparatus as claimed in claim 14 further comprising rotation-preventing means for preventing said magazine from rotating when said frame is in the second position.

17. A changing apparatus as claimed in claim 16 wherein said magazine has a plurality of slits formed therein, and said rotation-preventing means comprises an engaging member which is secured to said frame and which engages with one of said slits when said frame is in the second position.

18. A changing apparatus as claimed in claim 1 further comprising indicating means for indicating which storage slot in said magazine can be accessed by said loading device.

19. A changing apparatus as claimed in claim 18 wherein said indicating means comprises a plurality of identifying labels affixed to said magazine, each of said identifying labels corresponding to one of the storage slots in said magazine, each identifying label being located such that when it is in a prescribed viewing location, the corresponding storage slot is in a position such that it can be accessed by said loading device.

20. A changing apparatus for a recording medium comprising:

- a curved storage magazine having top and bottom sides and inside and outside curved edges, and having a plurality of storage slots for storing recording media formed therein, the storage slots being sloped with respect to the top and bottom sides of the magazine and overlapping one another in the circumferential direction of the magazine, the storage slots having openings for access along at least one of the edges of said magazine;
- an information transfer device mounted at an edge of said magazine and having mechanism for reading information from or writing information onto a recording medium;
- said magazine and said transfer device being relatively movable to align a storage slot opening with said transfer device; and
- a loading device for transferring a recording medium through an opening of one of said storage slots in said magazine to the aligned information transfer device so that said mechanism can read from or write onto the recording medium.

* * * * *